United States Patent Office 3,546,224
Patented Dec. 8, 1970

---

3,546,224
NOVEL QUINAZOLINE COMPOUNDS AND PROCESS MEANS FOR PRODUCING THE SAME
John Davoll, Shepperton, England, assignor to Parke, Davis & Company, Detroit, Mich., a corporation of Michigan
No Drawing. Filed Sept. 9, 1968, Ser. No. 767,028
Claims priority, application Great Britain, Sept. 11, 1967, 41,436/67
Int. Cl. C07d 51/48
U.S. Cl. 260—256.4                10 Claims

---

ABSTRACT OF THE DISCLOSURE 2,4-diamino - 6 - (substituted acylamino)quinazoline compounds (I)

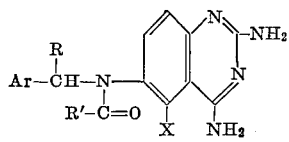

and their salts are provided by N-acylation of the corresponding 6-(substituted amino)quinazolines; where R and R' each can be hydrogen or lower alkyl, X is H, Cl or $CH_3$, and Ar is a group such as phenyl, substituted phenyl, naphthyl, furyl, thienyl or pyridyl. The compounds have pharmacological properties and are antiparasitic agents and antibacterial agents.

---

SUMMARY AND DETAILED DESCRIPTION

The present invention relates to new quinazoline compounds. More particularly, the invention relates to new 2,4-diamino-6-(substituted acylamino)quinazoline compounds, to salts thereof, and to process means for the production of the compounds.

In the free base form the compounds of the invention can be represented by the formula

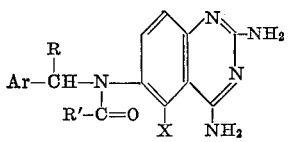

where R represents hydrogen or lower alkyl, X represents hydrogen, chlorine or methyl; R' represents hydrogen or lower alkyl and Ar represents phenyl, naphthyl, furyl, thienyl, pyridyl, or phenyl substituted by one, two or three substituents selected from among lower alkyl, lower alkoxy and halogen. The lower alkyl and lower alkoxy groups are those containing not more than 4 carbon atoms and are preferably methyl and methoxy. The preferred halogens are chlorine and bromine and especially chlorine.

In accordance with the invention compounds having the foregoing formula and their salts can be produced by reacting a 2,4-diaminoquinazoline compound having the formula:

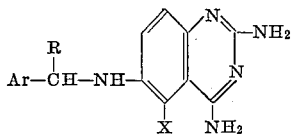

or an acid addition salt thereof with an acylating agent having the formula R'—COOH or a reactive derivative thereof; where R, R', X and Ar are as defined before. Some examples of suitable acylating agents are formic acid, alkanoyl halides, particularly alkanoyl chlorides, or acid anhydrides. The process using formic acid is conveniently carried out using excess formic acid, the excess serving as a convenient solvent at reflux temperature (about 1100° C.) until completion of formylation usually within 30 minutes to 5 hours. For the reaction using an alkanoyl halide a nonreactive solvent is employed. Some examples of suitable solvents for the reaction are ethers such as 1,2-dimethoxyethane, diethylene glycol dimethyl ether, dioxane and tetrahydrofuran; aromatic hydrocarbons such as benzene, toluene and xylene; chlorinated hydrocarbons such as chlorobenzene, trichloroethane, carbon tetrachloride and chloroform; dimethylformamide; dimethyl sulfoxide; and mixtures of such solvents. A preferred solvent for acylation with an alkanoyl halide is dimethylformamide. The acylation is conveniently carried out at room temperature. The starting material is cooled below room temperature before adding the alkanoyl halide. Upon addition, the heat of reaction brings the mixture to room temperature or above at which point the reaction is allowed to proceed to completion for periods ranging from several minutes up to a few hours. For acylation with an alkanoyl halide equimolar quantities of the reactants are ordinarily used or an excess of alkanoyl halide. An excess of 10% is preferred; larger excesses of alkanoyl halide are unnecessary. As an optional procedure the starting amino quinazoline can be reacted with a strong base such as sodamide following which the resultant salt is reacted with alkanoyl chloride. The product of acylation in accordance with the invention can be isolated either as the free base or as the acid addition salt product where required after first adjusting the pH of the reaction mixture.

The starting materials for the process can be prepared by the methods described in British Pat. 1,045,180. In general they can be prepared by reacting an aldehyde of the formula Ar—CHO or an acetal or ketal of the formula Ar-C-(lower alkyl)=(O-lower alkyl)$_2$ with an equimolar quantity of 2,4,6-triamino quinazoline of the formula

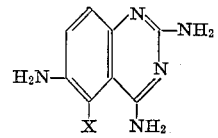

in an unreactive organic solvent, followed by reducing the resulting aralkylidene compounds or Schiff base of the formula

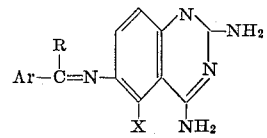

with sodium borohydride. The 2,4,6-triamino quinazoline required in this procedure can be obtained by reducing the corresponding 2,4-diamino-6-nitroquinazoline, for example by reacting it with stannous chloride in hydrochloric acid followed by treatment with base or by hydrogenation in the presence of a palladium catalyst. In these formulas R, X and Ar are as defined above. Other methods of preparation as described in British patent specification 1,045,180 can also be used.

The free base products of the invention form acid addition salts as indicated. The products form such salts with any of a variety of inorganic and organic acids. Pharmaceutically acceptable acid addition salts are formed with acids such as hydrochloric, hydrobromic, sulfuric, nitric, phosphoric, acetic, citric, tartaric, succinic, benzoic, salicylic, maleic, malic, gluconic, ascorbic and pamoic acids. The free bases and their salt forms are interconvertible by adjustment of the pH. They differ in solubility properties but in general are otherwise similar for the purposes of the invention.

The compounds of the invention possess significant pharmacological properties and, in suitable formulation in accordance with considerations known to those skilled in the art, are useful as pharmacological agents. The compounds are also useful as chemical intermediates for the production of pharmacological agents of the type described in British patent specification 1,045,180. Concerning their properties, the compounds are antiparasitic agents and especially antimalarial agents. Two compounds of the invention preferred for their antimalarial potency are N-(2,4-diamino-6-quinazolinyl) - N - (3,4-dichlorobenzyl)formamide and N-benzyl-N-(2,4-diamino-6-quinazolinyl)acetamide. The antimalarial potency of these compounds, as well as other compounds of the invention typically more potent than quinine in suppressing parasitemia, can be quantitatively measured in a standard assay procedure (Am. J. Trop. Med. & Hyg., 14, 343) against *Plasmodium berghei* infection. The compounds of the invention also exhibit antibacterial activity; in standard procedures they are bactericidal in vitro at low dilution (20 gamma/ml. or lower) against one or more organisms such as *Strep. pyogenes, Staph. aureous, E. coli, Dip. pneumoniae*, and *Salm. typhimurium*. The compounds also are active by the method reported in J. Protozool., 13, 110, against the causative organism of Chagas' disease, *Trypanosoma cruzi*. The compounds of the invention can be used as antimalarial agents, antibacterial agents and antitrypanosomal agents either in free base form or in acid addition salt form and are active by the oral or parenteral routes. The compounds can also be used for their antibacterial effect in disinfectant preparations having otherwise the conventional formulation, for sterilizing work areas, hospital rooms, etc.

The invention is illustrated by the following examples.

EXAMPLE 1

A mixture of 5.01 g. of 2,4-diamino-6-[(3,4-dichlorobenzyl)amino]quinazoline and 45 ml. of 98% formic acid is heated at reflux for 2 hours. The solution is evaporated to a syrup under reduced pressure and the residue dissolved in boiling water. The resulting hot solution is treated with charcoal, filtered, basified with concentrated aqueous ammonia and cooled. The product N-(2,4-diamino - 6 - quinazolinyl)-N-(3,4-dichlorobenzyl) formamide which separates as a crystalline precipitate and is collected and recrystallized from 80% aqueous ethanol; M.P. 254–255° C. with one formula weight of ethanol of crystallization. By the same procedure but starting with other related arylmethylaminoquinazoline starting materials, as follows, the following quinazolinyl formamide products are obtained:

| Starting material, 2,4-diamino-6-aryl-methylamino-quinazoline (g.) | Formic acid, ml. (98%) | Product, N-(2,4-diamino-6-quinazolinyl)-N-(aryl-methyl) formamide, M.P.,° C. |
|---|---|---|
| Phenyl (8.0) | 40 | 270–272 (hemihydrate). |
| o-Chlorophenyl (7.0) | 70 | 245–247 (hemihydrate). |
| m-Methylphenyl (7.04) | 75 | 268–270. |
| p-Methylphenyl (4.19) | 40 | 247–249 (hemihydrate). |
| 2,4,6-trimethylphenyl (4.36) | 40 | 252–254. |
| 2-naphthyl (9.6) | 90 | 273–275 (Monohydrate). |

Similarly by this procedure starting from the appropriate arylmethylaminoquinazolines the corresponding N-(2,4-diamino - 6 - quinazolinyl)-N-furfurylformamide, N-(m-chlorobenzyl)-N-(2,4-diamino - 6 - quinazolinyl)formamide, and N-(2,4-diamino-6-quinazolinyl)-N-(p-methoxybenzyl)formamide are produced.

EXAMPLE 2

A mixture of 1.0 g. of 2,4-diamino-5-chloro-6-[(3,4-dichlorobenzyl)amino]quinazoline and 8 ml. of 98% formic acid is heated at reflux for 2½ hours and is then evaporated at reduced pressure. The residue is dissolved in hot aqueous ethanol and the hot solution is treated with charcoal, filtered, basified with concentrated aqueous ammonia and chilled. The product, N-(2,4-diamino-5-chloro-6-quinazolinyl)-N-(3,4-dichlorobenzyl)formamide hemihydrate, precipitates and is collected; M.P. 214–215° C. after two recrystallizations from aqueous ethanol. The corresponding salt with one-half formula weight of pamoic acid is obtained by stirring together an ethanolic solution of the product with an aqueous solution of one-half equivalent of disodium pamoate monohydrate, cooling the resulting mixture and collecting the product which separates.

The starting material can be obtained as follows: A mixture of 37 g. of 2-amino-6-chlorobenzonitrile and 34.3 g. of cyanamide dihydrochloride in 240 ml. of diethylene glycol dimethyl ether is stirred and heated at 145–150° C. for 2½ hours. The mixture is cooled, diluted with 700 ml. of ether and the precipitated crude product, 2,4-diamino-5-chloroquinazoline hydrochloride, is collected and powdered. The crude product is stirred with 2.5 liters of boiling water; the mixture is basified with aqueous ammonia, treated with charcoal and filtered. The hot filtrate is chilled and the crystalline product, 2,4-diamino-5-chloroquinazoline, removed by filtration. After recrystallization from water the product melts at 183–185° C. To a stirred mixture of 270 ml. of fuming nitric acid (specific gravity=1.5) and 270 ml. of concentrated sulfuric acid is added in portions, over a 2½ hour period, 50 g. of 2,4-diamino-5-chloroquinazoline, while keeping the temperature below 20° C. The resulting solution is allowed to stand for 18 hours, then poured onto 3 kg. of crushed ice. The mixture is basified with concentrated aqueous ammonia while adding ice to maintain the temperature below 40° C. The product which separates, 2,4-diamino-5-chloro-6-nitroquinazoline, is collected, washed with water and dried. This product, 22.1 g., is added below 30° C. to a stirred solution of 65 g. of stannous chloride dihydrate in 350 ml. of concentrated hydrochloric acid and 92 ml. of acetic acid. The mixture is stirred 18 hours at 20° C. The resulting precipitate is collected by filtration, washed with minimum amounts of concentrated hydrochloric acid and water, and then suspended in ice water. The mixture is basified with 40% aqueous sodium hydroxide while adding ice to maintain the temperature below 40° C. The solid free base product, hydrated 2,4,6-triamino-5-chloroquinazoline, is collected, washed with water and dried; M.P. 200–203° C. after recrystallization from water following charcoal treatment. A solution of 18.6 g. of 2,4,6-triamino-5-chloroquinazoline and 17.5 g. of 3,4-dichlorobenzaldehyde in 200 ml. of ethanol is heated at reflux for 2 hours. The resulting solution containing the 3,4-dichlorobenzylidene compound is cooled. There is then added, with stirring, a solution of 9.9 g. of sodium borohydride in 150 ml. of methanol at 0–5° C. After one-half hour, the mixture is heated to boiling, then allowed to cool. The precipitated product, 2,4-diamino-5-chloro-6-[(3,4-dichlorobenzyl)amino]quinazoline, is collected and recrystallized from aqueous ethanol; M.P. 218–220° C.

EXAMPLE 3

A mixture of 2.09 g. of 2,4-diamino-6-[(α-methylbenzyl)amino]quinazoline and 10 ml. of 98% formic acid is heated at reflux for 2 hours and is evaporated at reduced pressure. The residue is dissolved in 140 ml. of hot 50% aqueous ethanol and the hot solution treated with charcoal, filtered, basified with concentrated aqueous ammonia and cooled. The contaminating solid which separates is removed by filtration and discarded, the filtrate is diluted with 150 ml. of water and evaporated to one-half volume. The product, N-(2,4-diamino-6-quinazolinyl)-N-(α-methylbenzyl)-formamide, which separates is collected; M.P. 236–237° C. after recrystallization from ethanol.

The starting material can be obtained as follows: A solution of 14 g. of 2,4,6-triaminoquinazoline and 15.5 g. of acetophenone diethyl acetal (also known as acetophenone diethyl ketal) in 80 ml. of diethylene glycol dimethyl ether is heated at the reflux temperature for 4½ hours. The ethanol formed in the reaction is continuously removed by distillation. The solution is filtered and cooled, 80 ml. of ether is added, and the product which separates, 2,4-diamino - 6 - [(α-methylbenzylidene)amino]quinazoline, is collected; M.P. 219–221° C. after recrystallization from ethanol. A suspension of 9.15 g. of this product in 300 ml. of ethanol is hydrogenated at 40° C. with platinum oxide catalyst for 8 hours. The mixture is filtered to remove catalyst, evaporated at reduced pressure to 60 ml., and diluted with 150 ml. of water to give the product, hydrated 2,4-diamino - 6 - [(α-methylbenzyl)amino]quinazoline; M.P. 200–202° C. after crystallization from aqueous ethanol.

EXAMPLE 4

A mixture of 2.65 g. of 2,4-diamino-6-benzylaminoquinazoline and 0.40 g. of sodamide in 30 ml. of dry dioxane is heated at reflux for 3 hours then cooled to 50° C. and treated with a solution of 0.79 g. of acetyl chloride at 10 ml. of dry dioxane. The mixture is heated at reflux for 15 minutes, cooled and diluted with 30 ml. of water. The solution is taken to one-half volume by evaporation and the product N-benzyl-N-(2,4-diamino-6-quinazolinyl) acetamide collected as a solid which precipitates; M.P. 239–252° C. after recrystallization from ethanol. The melting point remains unchanged by further recrystallization from ethanol.

EXAMPLE 5

A solution of 3.34 g. of 2,4-diamino-6-[(3,4-dichlorobenzyl)amino]quinazoline in 25 ml. of dimethylformamide and 25 ml. of toluene is heated at reflux under a water separator for 30 minutes to insure complete dryness of the mixture. The solution is evaporated under reduced pressure to one-half volume and cooled to 0° C. Acetyl chloride (0.86 g.) is added and the mixture agitated. The temperature rises to 35° C. and the resulting clear solution is allowed to stand for 1 hour at room temperature and is then diluted with 100 ml. of water and basified with concentrated aqueous ammonia. The product N-(2,4-diamino-6-quinazolinyl) - N - (3,4 - dichlorobenzyl)acetamide which separates is collected by filtration, taken up in ethanol, the ethanolic solution treated with charcoal and crystallized; M.P. 276–278° C.

By the same procedure but using propionyl chloride (1.02 g.) in place of acetyl chloride the product obtained is N-(2,4-diamino-6-quinazolinyl) - N - (3,4-dichlorobenzyl)-propionamide; M.P. 275–277° C. from ethanol.

Also by the same procedure using in each instance the corresponding amount of the appropriate alkanoyl chloride the following products are obtained:

N-(p-chlorobenzyl)-N-(2,4-diamno-6-quinazolinyl) acetamide

N-(2,4-diamino-6-quinazolinyl)-N-(2,4-dichlorobenzyl) acetamide

N-(p-bromobenzyl)-N-(2,4-diamino-6-quinazolinyl) propionamide

N-(2,4-diamino-6-quinazolinyl)-N-(3,4,5-trimethoxybenzyl)propionamide

N-(2,4-diamino-6-quinazolinyl)-N-(p-fluorobenzyl) butyramide

N-(2,4-diamino-6-quinazolinyl)-N-(3,4-dichlorobenzyl) butyramide

EXAMPLE 6

A mixture of 2.79 g. of 2,4-diamino-6-benzylamino-5-methylquinazoline and 30 ml. of 98% formic acid is heated at reflux for 2 hours. The reaction mixture is concentrated under vacuum and the residual oil is dissolved in boiling water, treated with charcoal, filtered, basified with concentrated aqueous ammonia and cooled. The product N-benzyl-N-(2,4-diamnio-5-methyl-6-quinazolinyl)formamide separates as a crystalline precipitate and is collected and recrystallized from 50% aqueous ethanol; M.P. 230–232° C. By the same procedure, but substituting for the benzylamine starting material an equivalent amount of the corresponding 3,4-dichlorobenzylamine, the product obtained is N-(2,4-diamino-5-methyl-6-quinazolinyl) - N - (3,4 - dichlorobenzyl)formamide; M.P. 231–235° C.

The starting material can be obtained as follows: With stirring, 60 g. of 2-methyl-6-chlorobenzonitrile is added in portions at −15 to −10° C. to 300 ml. of fuming nitric acid (specific gravity=1.5). The mixture is allowed to stand for 24 hours at room temperature, and is then added, with stirring, to 4.5 liters of ice water. The solid which separates, 2-methyl-3-nitro-6-chlorobenzonitrile, is collected and recrystallized from aqueous ethanol; M.P. 75–80° C. A mixture of 20 g. of the latter product, 38 g. of guanidine carbonate and 1.0 liter of ethylene glycol monoethyl ether is heated at reflux for 3½ hours. The solution is evaporated at reduced pressure and the residue triturated with 200 ml. of water. The crude 2,4-diamino-5-methyl-6-nitroquinazoline is collected by filtration and dissolved in 200 ml. of hot 80% aqueous acetic acid. The solution is filtered, diluted with 30 ml. of 6 N aqueous ammonia and chilled to crystallize the acetate salt of 2,4-diamino-5-methyl-6-nitroquinazoline; M.P. 288° C. with decomposition. A mixture of 9.0 g. of this product, 500 ml. of ethanol, and 1.0 g. of 10% palladium on charcoal catalyst is shaken at 45° C. with hydrogen at atmospheric pressure until hydrogen uptake ceases. The mixture is filtered and the filtrate concentrated to a volume of 50 ml, and chilled to crystallize the free base product, 2,4,6-triamino-5-methylquinazoline; M.P. 220–222° C. A solution of 2.5 g. of 2,4,6-triamino-5-methylquinazoline and 1.41 g. of benzaldehyde in 20 ml. of ethylene glycol monoethyl ether is heated at reflux for 3 hours. The resulting mixture containing a benzylidene compound is then hydrogenated in 600 ml. of ethanol at 100° C. at a hydrogen pressure of 65 atmospheres using Raney nickel catalyst. The mixture is cooled, filtered to remove catalyst, and evaporated at reduced pressure to give the free base product, 2,4-diamino-6-benzylamino-5-methylquinazoline; M.P. 191–195° C.

EXAMPLE 7

A mixture of 2.03 g. of 2,4-diamino-6-(2-thenylamino) quinazoline and 10 ml. of 98% formic acid is heated at reflux for 2 hours. The reaction mixture is concentrated under vacuum and the residue taken up in boiling water. The hot solution is treated with charcoal, filtered, basified (concentrated aqueous ammonia) and cooled. The crystalline product, N-(2,4-diamino-6-quinazolinyl)-N-2-thenyl) formamide, separates in crystalline form and is collected and recrystallized from ethanol; M.P. 252–254° C.

The starting material can be obtained as follows: A solution of 11.2 g. of 2-thiophenecarboxaldehyde and 17.5 g. of 2,4,6-triaminoquinazoline in 150 ml. of ethylene glycol monoethyl ether is heated at reflux for 2 hours. The solution is cooled and treated at 0° C. with a solution of 10.8 g. of sodium borohydride in 500 ml. of methanol. The solution is heated at reflux for 1 hour, treated with an additional 5.4 g. of sodium borohydride, then heated at reflux for 15 minutes. The solution is stirred with charcoal, filtered, and evaporated to a paste. The paste is triturated with 1.0 liter of 0.5 N aqueous sodium hydroxide and the solid product collected by filtration. The product is dissolved in cold 2 N hydrochloric acid. This solution is washed with ether and then basified with aqueous sodium hydroxide to precipitate 2,4-diamino-6-(2-thenylamino)quinazoline; M.P. 227–229° C. after crystallization from aqueous ethanol.

EXAMPLE 8

A mixture of 10.36 g. of 2,4-diamino-6-(2-pyridylmethylamino)quinazoline and 120 ml. of 98% formic acid is heated at reflux for 2 hours. The solution is evaporated under vacuum and the residue dissolved in 250 ml. of hot 50% aqueous ethanol. The hot solution is treated with charcoal, filtered, basified (concentrated aqueous ammonia), diluted with 100 ml. of water and evaporated. The product, N-(2,4-diamino-6-quinazolinyl)-N-(2-pyridylmethyl)formamide, separates and is recrystallized from 50% aqueous ethanol; M.P. 238–241° C.

I claim:

1. Novel, 2-4-diamino-6-(substituted acylamino)quinazoline compounds and salts thereof represented in free base form by the formula

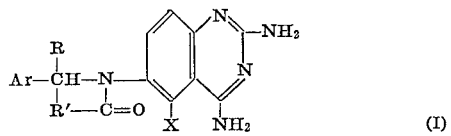

(I)

where R is hydrogen or lower alkyl, X represents hydrogen, chlorine or methyl; R' represents hydrogen or lower alkyl and Ar represents phenyl, naphthyl, furyl, thienyl, pyridyl, or phenyl substituted by one, two or three substituents selected from among lower alkyl, lower alkoxy and halogen.

2. Compounds according to claim 1 wherein the lower alkyl and lower alkoxy groups are methyl or methoxy groups and halogen is chlorine or bromine.

3. N-(2,4-diamino-5-chloro-6-quinazolinyl-N - (3,4 - dichlorobenzyl)formamide.

4. N-(2,4-diamino-6-quinazolinyl - N - (3,4 - dichlorobenzyl)formamide.

5. N-(o-chlorobenzyl)-N-(2,4-diamino - 6 - quinazolyl)formamide.

6. N-(2,4-diamino-6-quinazolinyl)-N-(α-methylbenzyl)formamide.

7. N-benzyl-N-(2,4-diamino-6-quinazolinyl)acetamide.

8. N-(2,4-diamino-6-quinazolinyl) - N - (3,4 - dichlorobenzyl)acetamide.

9. N-benzyl-N-(2,4-diamino-5-methyl-6 - quinazolinyl)formamide.

10. N-(2,4-diamino-5-methyl-6-quinazolinyl) - N - (3,4-dichlorobenzyl)formamide.

References Cited

Wagner et al.: Synthetic Organic Chemistry, John Wiley, New York, 1953, pp. 566–7.

ALEX MAZEL, Primary Examiner

R. J. GALLAGHER, Assistant Examiner

U.S. Cl. X.R.

260—240, 256.5; 474—200, 232, 251